United States Patent
Wu et al.

(10) Patent No.: US 11,731,683 B2
(45) Date of Patent: Aug. 22, 2023

(54) CART HANDLE AND BABY CART

(71) Applicants: DONGGUAN JINWANG CHILDREN PRODUCTSCO LTD., Guangdong (CN); BABY TREND, INC., Fontana, CA (US)

(72) Inventors: Wenbo Wu, Guangdong (CN); Hu Chen, Guangdong (CN); John Riedl, Fontana, CA (US); Chin-Kuan Lac, Fontana, CA (US); Michael Cavins, Fontana, CA (US); Bo Xiao, Fontana, CA (US)

(73) Assignees: Dongguan Jinwang Children Products Co Ltd., Dongguan (CN); Baby Trend, Inc., Fontana, CA (US)

( * ) Notice: Subject to any disclaimer, the term of this patent is extended or adjusted under 35 U.S.C. 154(b) by 0 days.

(21) Appl. No.: 17/635,099

(22) PCT Filed: Jan. 11, 2021

(86) PCT No.: PCT/CN2021/071009
§ 371 (c)(1),
(2) Date: Feb. 14, 2022

(87) PCT Pub. No.: WO2022/083010
PCT Pub. Date: Apr. 28, 2022

(65) Prior Publication Data
US 2022/0355846 A1 Nov. 10, 2022

(30) Foreign Application Priority Data
Oct. 20, 2020 (CN) .......................... 202022351896.1

(51) Int. Cl.
*B62B 9/20* (2006.01)
*B62B 7/04* (2006.01)

(52) U.S. Cl.
CPC . *B62B 9/20* (2013.01); *B62B 7/04* (2013.01)

(58) Field of Classification Search
CPC .. B62B 9/20; B62B 7/04; B62B 7/042; B62B 7/06
See application file for complete search history.

(56) References Cited

U.S. PATENT DOCUMENTS

| 5,197,753 A | * | 3/1993 | Liu ........................... B62B 7/08 280/658 |
| 5,516,142 A | * | 5/1996 | Hartan ....................... B62B 7/06 280/655.1 |

(Continued)

FOREIGN PATENT DOCUMENTS

| CN | 2696951 Y | 5/2005 |
| CN | 2719680 Y | 8/2005 |

(Continued)

OTHER PUBLICATIONS

China Intellectual Property Office, International Search Report and Written Opinion of the International Searching Authority (non-English), International Application No. PCT/CN2021/071009, 12 pages, dated Jul. 12, 2021.

*Primary Examiner* — John D Walters
(74) *Attorney, Agent, or Firm* — Thompson Hine LLP

(57) ABSTRACT

A cart handle and a baby cart in which cart handle includes a fixed member; a handle body rotatable relative to the fixed member; an engagement part having a first portion that non-rotatably engages the handle body and slidably engages the handle body, and having a second portion that non-rotatably engages the fixed member; and an operation part that is actuated to alternately displace the engagement part to an unlocked position, wherein the second portion is not in engagement with the fixed member, thereby permitting rotation of the handle body relative to the fixed member, and displace the engagement part to a locked position, wherein (Continued)

the second portion engages the fixed member, thereby preventing rotation of the handle body relative to the fixed member.

15 Claims, 8 Drawing Sheets

(56) References Cited

U.S. PATENT DOCUMENTS

| | | | |
|---|---|---|---|
| 6,442,797 B1 * | 9/2002 | Yang .......................... | B62B 9/20 16/113.1 |
| 9,150,273 B2 * | 10/2015 | Baron ...................... | B62B 5/067 |
| 10,279,832 B2 * | 5/2019 | Fleming .................. | B62B 9/085 |

FOREIGN PATENT DOCUMENTS

| | | | |
|---|---|---|---|
| CN | 203332177 U | | 12/2013 |
| CN | 111252129 A | * | 6/2020 |
| DE | 20010856 U1 | | 9/2000 |
| JP | 2012116369 A | | 6/2012 |

* cited by examiner

CART HANDLE AND BABY CART

FIELD

The present application relates to the field of baby carts, and more particularly to a cart handle and a baby cart.

BACKGROUND

Cart handles of carts for carrying a baby mostly have a fixed form. However, sometimes different users have different habits and have different needs on the orientation of the cart handle. Thus, the conventional fixed handles are hard to meet the user's needs. In response to such needs, similar modifications have existed in the related art. For example, China patent document No. CN2696951Y discloses a cart handle with rotational function. In this solution, when the orientation of the handle needs to be adjusted, it can be achieved by pushing and pulling the handle. However, this has problems of malfunction, easy damage, unstable turning operation, etc., and there is room for improvement.

SUMMARY

An objective of the present application is intended to overcome disadvantages of the related art, and provide a cart handle, which unlocks or locks rotation of a handle body by a sliding unlocking assembly independently of a handle, the probability of malfunction can be effectively reduced.

Technical solution of the present application provides a cart handle including: a handle body, a fixed member and a rotating member. The fixed member and the rotating member are provided in a same axis direction, the rotating member is rotatable about the axis relative to the fixed member and positionable at at least two different rotation angles, and the two are non-displaced or kept unseparated in the axis direction. The handle body is fixedly connected to, integrally formed with or detachably and fixedly connected to the rotating member.

The cart handle further includes a sliding unlocking assembly slidable in the axis direction relative to the rotating member and a sliding engagement part and the rotating member are relatively non-rotating.

The rotating member includes a movable state and a locked state.

When the rotating member is in the locked state, the sliding unlocking assembly slides towards the fixed member and is locked with the fixed member to make the fixed member and the rotating member relatively non-rotating.

When the rotating member is in the movable state, the sliding unlocking assembly slides away from the fixed member and unlocks the rotating member to make the rotating member rotatable relative to the fixed member.

In the present device, the rotating member and the handle body are fixedly connected, thus rotation of the handle body can drive the rotating member to rotate. When the user needs to adjust use angle of the handle body, the sliding unlocking assembly can be controlled to move upwards in the axial direction. Thus, the sliding unlocking assembly is disengaged from the fixed member to enable relative rotation between the fixed member and the rotating member. In this case, the user can rotate the handle body to a desired angle. After completion of angle adjustment, the user operate the sliding unlocking assembly to slide it towards the fixed member in the axial direction to fix the sliding unlocking assembly and the fixed member together. In this case, the relative rotation motion between the fixed member and the rotating member is disenabled to achieve the fixing of the position of the handle body. The present device achieves locking or unlocking of the rotation part by controlling the sliding unlocking assembly. In the locked state, the handle body will not drive the rotating member to act, which is not prone to malfunction during use.

Preferably, the sliding unlocking assembly includes a sliding engagement part, the sliding engagement part is provided with first engaging teeth, the fixed member is provided with third engaging teeth, and the first engaging teeth and the third engaging teeth are positionable at at least two different rotation angles.

When the rotating member is in the movable state, the sliding engagement part moves upwards in the axis direction to separate the first engaging teeth and the third engaging teeth, and the rotating member and the handle body are rotatable about the axis.

When the rotating member is in the locked state, the sliding engagement part moves downwards in the axis direction to engage the first engaging teeth and the third engaging teeth, and positions of the rotating member and the handle body are relatively fixed.

When angle of the handle body needs to be adjusted, the sliding engagement part is moved away from the fixed member to disengage the first engaging teeth and the third engaging teeth. In this case, relative rotation between the rotating member and the fixed member is enabled, and the user can grip the handle body and rotate it to a desired angle. When the position of the handle body needs to be locked, the sliding engagement part is slid towards the fixed member to engage the first engaging teeth and the third engaging teeth, thereby achieving fixing of the position between the rotating member and the fixed member. In this case, the rotating member cannot perform a rotational movement relative to the fixed member to make position of the handle body fixed. The present device achieves unlocking or locking of the rotating member by controlling the sliding engagement part, and when in the locked state the position of the handle body is fixed and cannot be unlocked by moving the handle body. Thus, it is not easy to unlock by mistake due to malfunction during use, and the service life of the device can also be extended at the same time. Additionally, the orientation of the handle body can be more stably and accurately adjusted by way of adjusting the rotation angle of the handle body through engagement of engaging teeth.

Preferably, the sliding unlocking assembly further includes an elastic member configured to push the sliding engagement part in the axis direction to keep the locked state with the fixed member, and the elastic member is provided between the sliding engagement part and the rotating member. The elastic member is a spring. The spring has an upper end abutting against the rotating member and a lower end abutting against the sliding engagement part. The spring is always in a compressed state to provide an action force on the sliding engagement part towards the fixed member. Thus, it is ensured that in the locked state, the sliding engagement part always keeps the first engaging teeth and third engaging teeth in an engaged state, and the position of the sliding engagement part is not easy to change, ensuring the stability of the locking. When the rotating member is in the movable state, the sliding engagement part is moved away from the fixed member to overcome the elastic force action of the spring and further compress the spring, and thus the first engaging teeth and the third engaging teeth are disengaged. In this case, the rotating member can be rotated to adjust the angle of the handle body. After completion of the adjustment, the user withdraws the action force on the sliding engagement part, and the elastic force action of the spring will push the sliding engagement part downwards to move the sliding engagement part until the first engaging teeth and the third engaging teeth are in the engaged state, thereby achieving the locking.

Preferably, the cart handle further includes a rotating guide mechanism including a guiding groove and a guiding protrusion. The guiding protrusion is slidably provided in the guiding groove.

The guiding groove is defined in the rotating member, and the guiding protrusion is provided on the fixed member.

Or, the guiding groove is defined in the fixed member, and the guiding protrusion is provided on the rotating member; when the rotating member and the fixed member rotate relatively, the guiding protrusion slides along and in the guiding groove.

The guiding groove is an arc-shaped groove surrounding the axis, and its contour trace is the same as the rotation trace of the guiding protrusion. The guiding groove may be set to a semi-circular groove, a full circular groove, to a ¼ circular groove, to limit extreme rotation angle of the rotating member.

Preferably, the first engaging teeth include a first tooth body, and a second tooth body. The first engaging teeth further include an angle limiting protrusion, at least one angle limiting protrusion is provided between adjacent third engaging teeth, a wall face of the first tooth body defines a limiting groove matching the angle limiting protrusion, and when the first engaging teeth engage with the third engaging teeth, the angle limiting protrusion is snap-fitted into the limiting groove. The second tooth body is a solid tooth, and when the angle limiting protrusion rotates to a corresponding second tooth body, the first engaging teeth cannot engage with the third engaging teeth. The angle limiting protrusion is used to exclude positioning of some special angles, and when at an angle suitable for adjustment, the wall face of a corresponding first tooth body is provided with the limiting groove matching the angle limiting protrusion. In this case, the first engaging teeth can engage with the third engaging teeth to lock the position of the rotating member. When rotated to an excluded angle, the angle limiting protrusion and the second tooth body are in the same axis direction. In this case, since the second tooth body is provided with no limiting groove, the angle limiting protrusion will abut against an end face of the second tooth body and the first engaging teeth cannot engage with the third engaging teeth, to achieving exclusion of positioning of special angles.

Preferably, the fixed member and the rotating member are connected through a connecting rod, the fixed member defines a first center hole, the rotating member defines a second center hole, the sliding engagement part defines a third center hole, the connecting rod passes through the first center hole, the second center hole and the third center hole, the connecting rod is fixedly connected to the second center hole, an end of the connecting rod is provided with a fixing head, the fixed member defines a fixing chamber in communication with the first center hole, the fixing head is snap-fitted into the fixing chamber, an end face of the fixing head abuts against an end face of the fixing chamber to make positions of the rotating member and the fixed member relatively fixed in the axis direction of the connecting rod. Rotation centers of the fixed member, the rotating member and the sliding engagement part are all disposed in the same axis direction, and they are connected together by the connecting rod. At the same time, the fixing head at the lower end of the connecting rod is snap-fitted into the fixing chamber. Thus, relative position of the rotating member and the fixed member is fixed, to avoid separation of the rotating member and the fixed member from the axis direction of the connecting rod.

Preferably, the sliding engagement part includes a head part and a wing plate provided on the head part, the first engaging teeth are provided on an outer circumferential wall of the head part, and the rotating member defines a penetrating hole for passage of the wing plate. The wing plate is slidably provided in the penetrating hole, and thus the penetrating hole can have a guiding effect when the sliding engagement part moves.

Optionally, the sliding unlocking assembly includes an insertion pin. The rotating member is eccentrically provided with several first pin holes, and the fixed member is eccentrically provided with several second pin holes.

When the rotating member is in the movable state, the insertion pin moves upwards in the axis direction, to render the insertion pin to separate from the first pin hole and the second pin hole.

When the rotating member is in the locked state, the insertion pin moves downwards in the axis direction, to render the insertion pin to pass through the first pin hole and the second pin hole.

When locking the rotating member, the insertion pin is inserted into the first pin hole and the second pin hole simultaneously, and thus the rotating member cannot rotate about the axis, to achieve the locking.

Preferably, the cart handle further includes an operation part. The operation part is a sliding sleeve slidably fitted over an outer circumference of the rotating member, the sliding sleeve is connected to the sliding unlocking assembly through a link rod, the rotating member defines a slot hole, the link rod passes through the slot hole and is connected to the sliding unlocking assembly to enable the sliding unlocking assembly to slide in the axis direction relative to the rotating member and make the sliding engagement part and the rotating member relatively non-rotating; the sliding sleeve covers the slot hole, and when the sliding sleeve slides in an axial direction of the rotating member away from the fixed member, the sliding engagement part is driven to unlock the rotating member. The sliding sleeve provided on the rotating member can facilitate unlocking and locking operations of the user, and the sliding sleeve also can cover the slot hole to make the device more aesthetic.

Optionally, the operation part is an operation rod having an end extending out of the handle body, the operation rod is connected to the sliding unlocking assembly, and the operation rod is slidably connected to the handle body. The operator achieves control of action of the sliding unlocking assembly by pulling the operation rod.

Preferably, the rotating member is provided with second engaging teeth, the first engaging teeth engage with the second engaging teeth to make the sliding engagement part and the rotating member relatively non-rotating. Specially, the second engaging teeth and the third engaging teeth have the same size, the second engaging teeth and the third engaging teeth are provided on different plane directions, the second engaging teeth also have a guiding effect, and when the first engaging teeth and the second engaging teeth are engaged, the sliding engagement part is slidable in the axial direction. When it is required to change from the movable state to the locked state, the rotating member is rotated to align the second engaging teeth and the third engaging teeth in the axis direction, and in this case, the sliding engagement member can slide towards the fixed member in the axis direction to enable the first engaging teeth to engage with the third engaging teeth. Additionally, the first engaging teeth can engage with the second engaging teeth and the third engaging teeth at the same time, and the relative non-rotating between the sliding engagement part and the rotating member can be achieved. The following beneficial effects is obtained by employing the above-described technical solutions: the present device achieves locking or unlocking of the rotation of the handle body by controlling the sliding unlocking assembly, the handle body will not be unlocked when it is used by the user, and unlocking due to malfunction during use will not occur.

A baby cart includes an above-described cart handle, and the handle is mounted on a cart frame of the baby cart. A conventional baby cart includes a cart wheel, a cart frame and a cart handle. The cart frame is used to carry a baby, the cart wheel is mounted to a bottom of the cart frame to move the cart frame, and the cart handle is mounted to an upper portion of the cart frame for grip of the user and controlling movement of the cart.

BRIEF DESCRIPTION OF THE DRAWINGS

With reference to the accompanying drawings, the disclosure of the present application will become easier for understanding. It should understand that these accompanying drawings are merely for purpose of illustration, and are not intended to limit the protection scope of the present application, in which.

Figure 1:
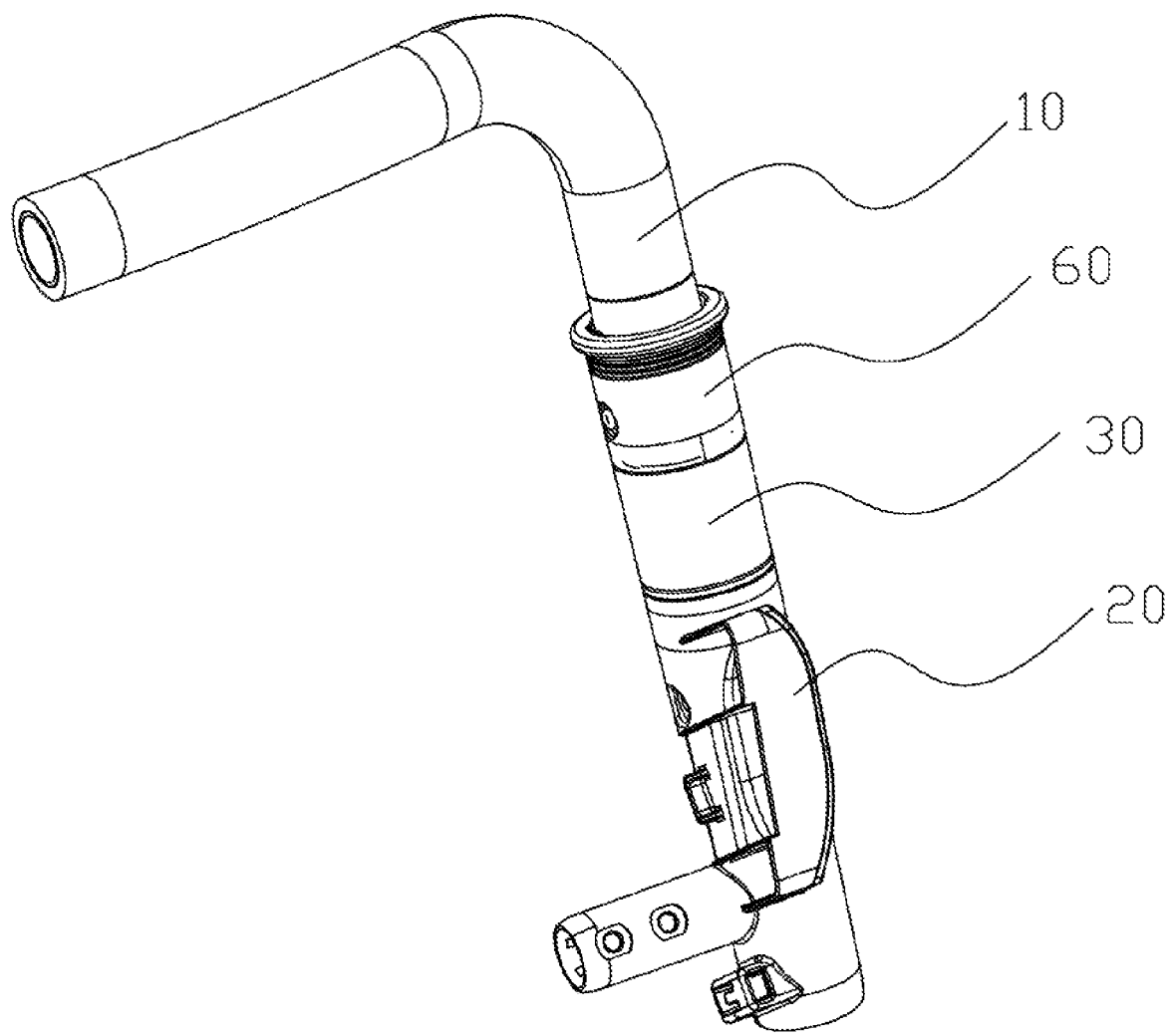
FIG. 1 is a schematic view of an overall structure of a cart handle according to an embodiment of the present disclosure.

REFERENCE NUMERALS handle body 10;
fixed member 20; third engaging teeth 200; first center hole 201; guiding protrusion 202; angle limiting protrusion 203;
rotating member 30; second engaging teeth 300; second center hole 301; slot hole 302; penetrating hole 303; guiding groove 304; limiting wall 305;
sliding engagement part 40; first engaging teeth 400; first tooth body 4001; second tooth body 4002; limiting groove 4003; head part 401; wing plate 402; connection hole 4021; third center hole 403;
connecting rod 50, sliding sleeve 60, spring 70, link rod 80;
cart frame 02; cart wheel 03.

DETAILED DESCRIPTION

The specific implementation of the present application will be further described below in conjunction with the drawings.

It could be readily understood that, according to the technical solutions of the present application, various structural modes and implementation modes can be mutually replaced by one of ordinary skill in the art without changing the essential spirit of the present application. Therefore, the following specific implementations and drawings are only exemplary illustration of the technical solutions of the present application, and should not be regarded as all of the present application or as a restriction or limitation to the technical solutions of the application.

The directional terms such as up, down, left, right, front, back, front face, back face, top, bottom, etc., mentioned or may be mentioned in this specification are defined relative to the structure illustrated in the drawings and are relative concepts, thus they may change accordingly according to their different positions and different usage conditions. Therefore, these or other directional terms should not be interpreted as restrictive terms. In addition, terms such as "first" "second" and "third" are used herein for purposes of description and are not intended to indicate or imply relative importance or significance.

In the description of the present application, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication between two elements. The specific meaning of the above terms in the present application can be understood by those skilled in the art according to specific situations.

Embodiment 1

Figure 2:
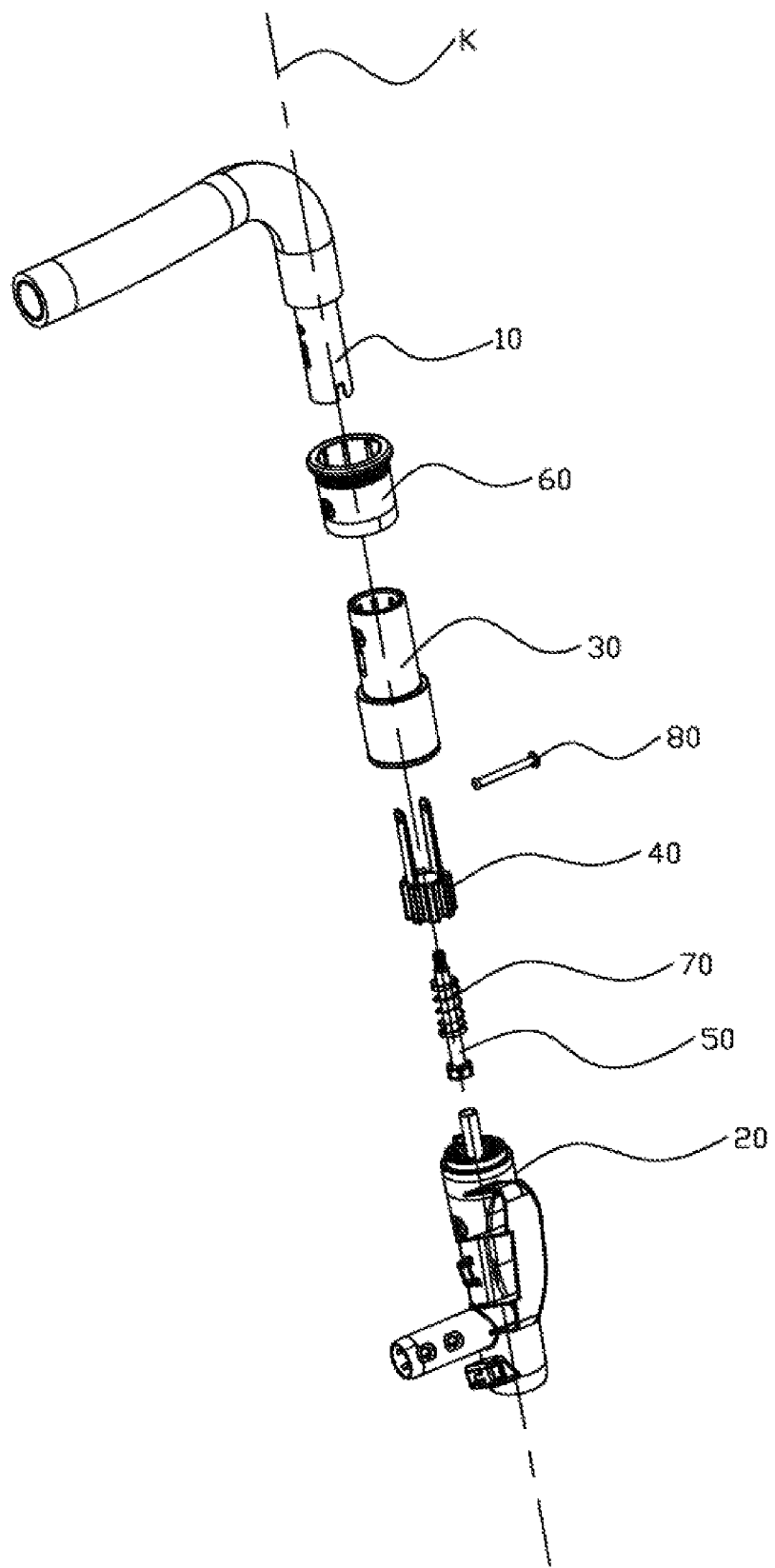
FIG. 2 is an exploded view of FIG. 1.
Figure 3:
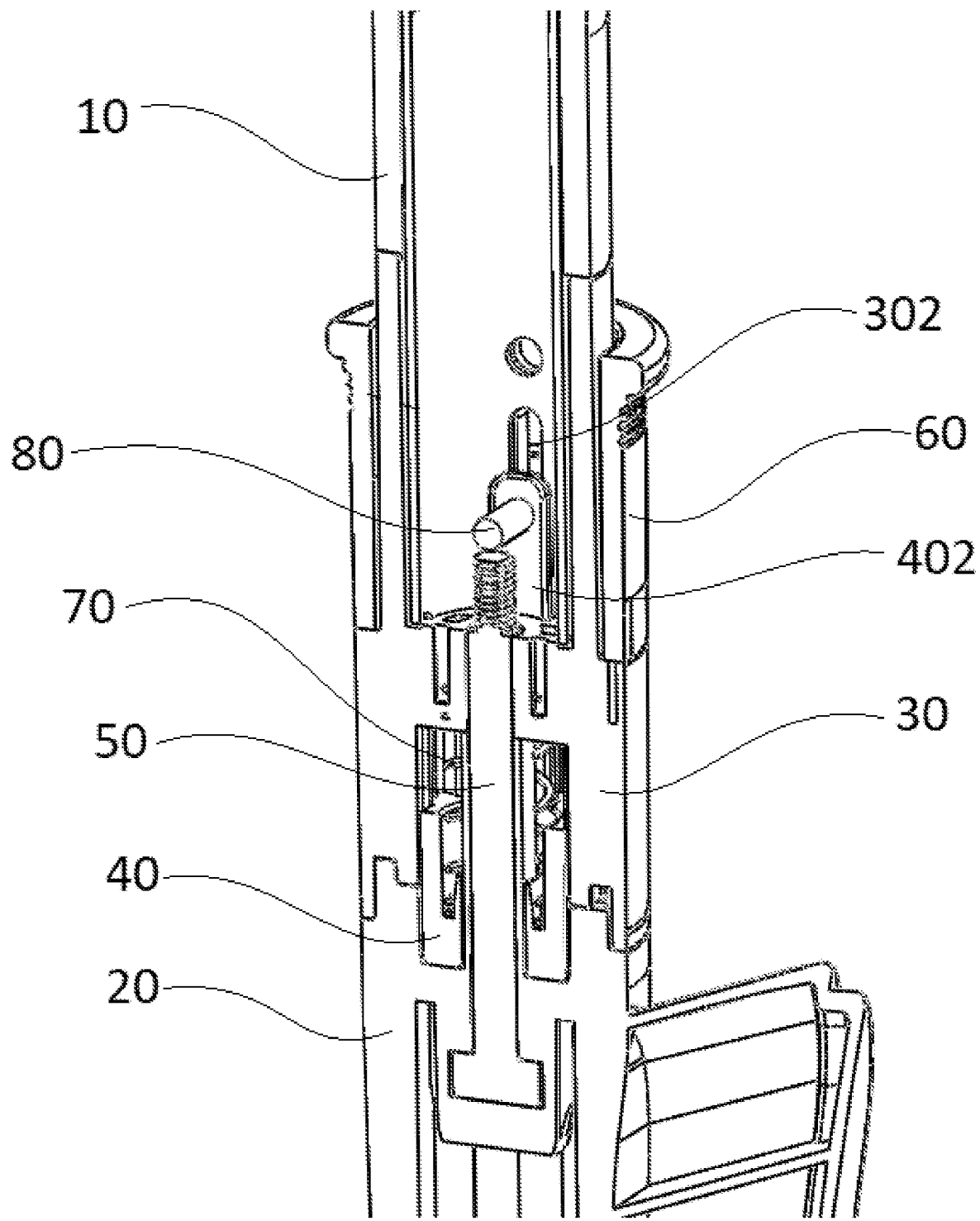
FIG. 3 is a sectional view of a cart handle according to an embodiment of the present disclosure.

The present embodiment discloses a cart handle, as illustrated in FIGS. 1 to 3, it includes a handle body 10, a fixed member 20, a rotating member 30, a connecting rod 50, an operation part and a sliding unlocking assembly. K indicated in FIG. 2 is an axis. The rotating member 30 has a hollow structure, an interior of the rotating member 30 defines a cavity, and an end of the rotating member 30 abuts against an end of the fixed member 20. An end of the handle body 10 is fixedly connected to the rotating member 30. When the handle body 10 rotates, it can drive the rotating member 30 to rotate together.

The sliding unlocking assembly in the present embodiment is a sliding engagement part 40, the operation part and the sliding engagement part 40 are fixedly connected, and the action of the sliding engagement part 40 can be controlled by the operation part. The sliding engagement part 40 is slidably provided in the cavity of the rotating member 30, and rotation centers of the fixed member 20, the rotating member 30 and the sliding engagement part 40 are all disposed in the same axis. Specifically, the fixed member 20 defines a first center hole 201 (FIG. 5), the rotating member 30 defines a second center hole 301 (FIG. 6), the sliding engagement part 40 defines a third center hole 403 (FIG. 7), the connecting rod 50 passes through the first center hole 201, the second center hole 301 and the third center hole 403. Thus, the rotating member 30 and the sliding engagement part 40 can rotate about an axis direction of the connecting rod 50, and meanwhile the sliding engagement part 40 can also slide up and down in the axis direction of the connecting rod 50.

Particularly, the fixed member 20 defines a fixing chamber in communication with the first center hole 201, an upper end of the connecting rod 50 is fixedly connected to the second center hole 301, a lower end of the connecting rod 50 is provided with a fixing head, the fixing head is provided in the fixing chamber, and an end face of the fixing head abuts against an end face of the fixing chamber. Thus, positions of the rotating member 30 and the fixed member 20 are relatively fixed in the axis direction of the connecting rod 50 to keep ends of the rotating member 30 and the fixed member 20 in an abutting state.

Figure 4:
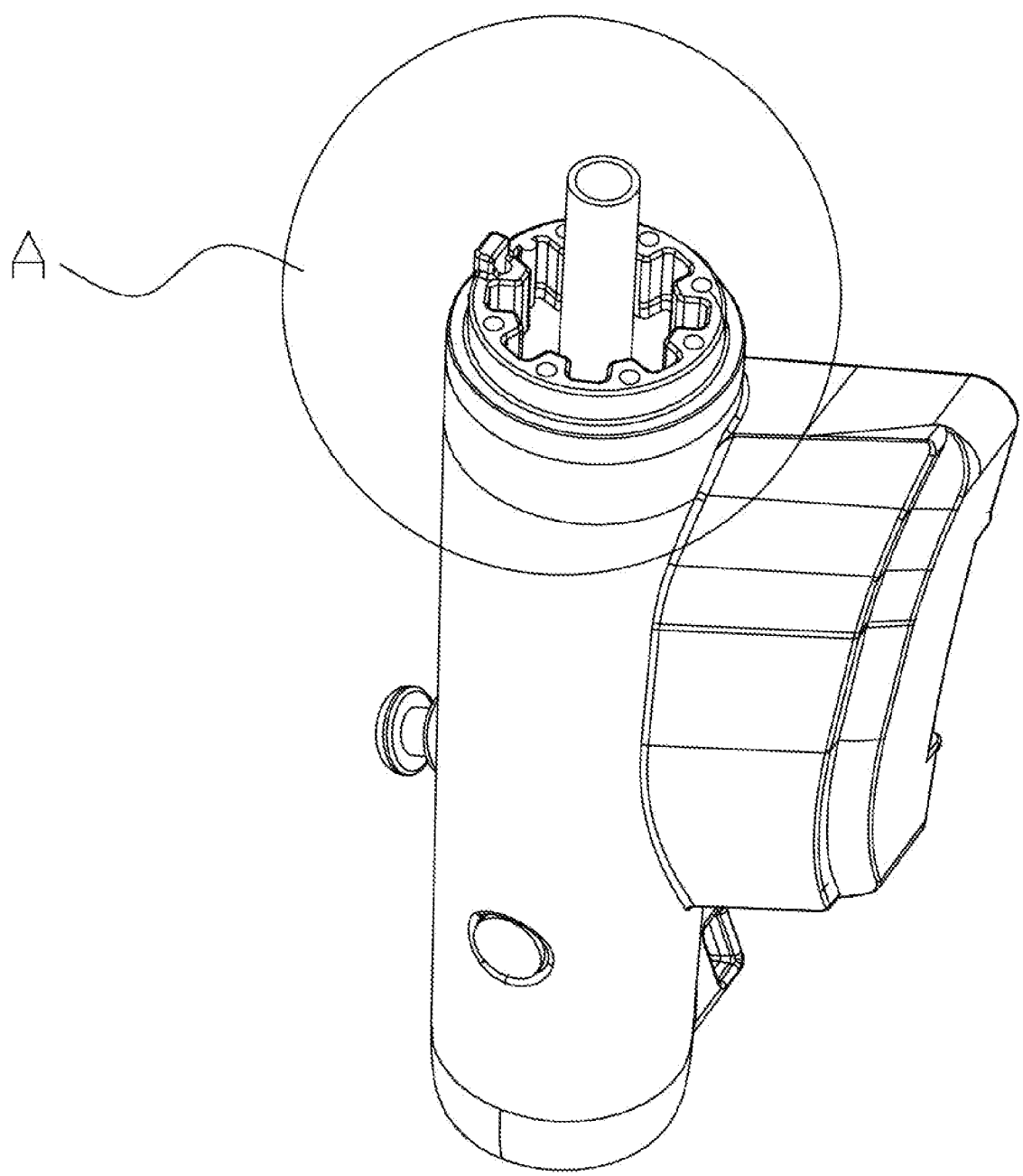
FIG. 4 is a schematic view of a fixed member according to an embodiment of the present disclosure.
Figure 5:
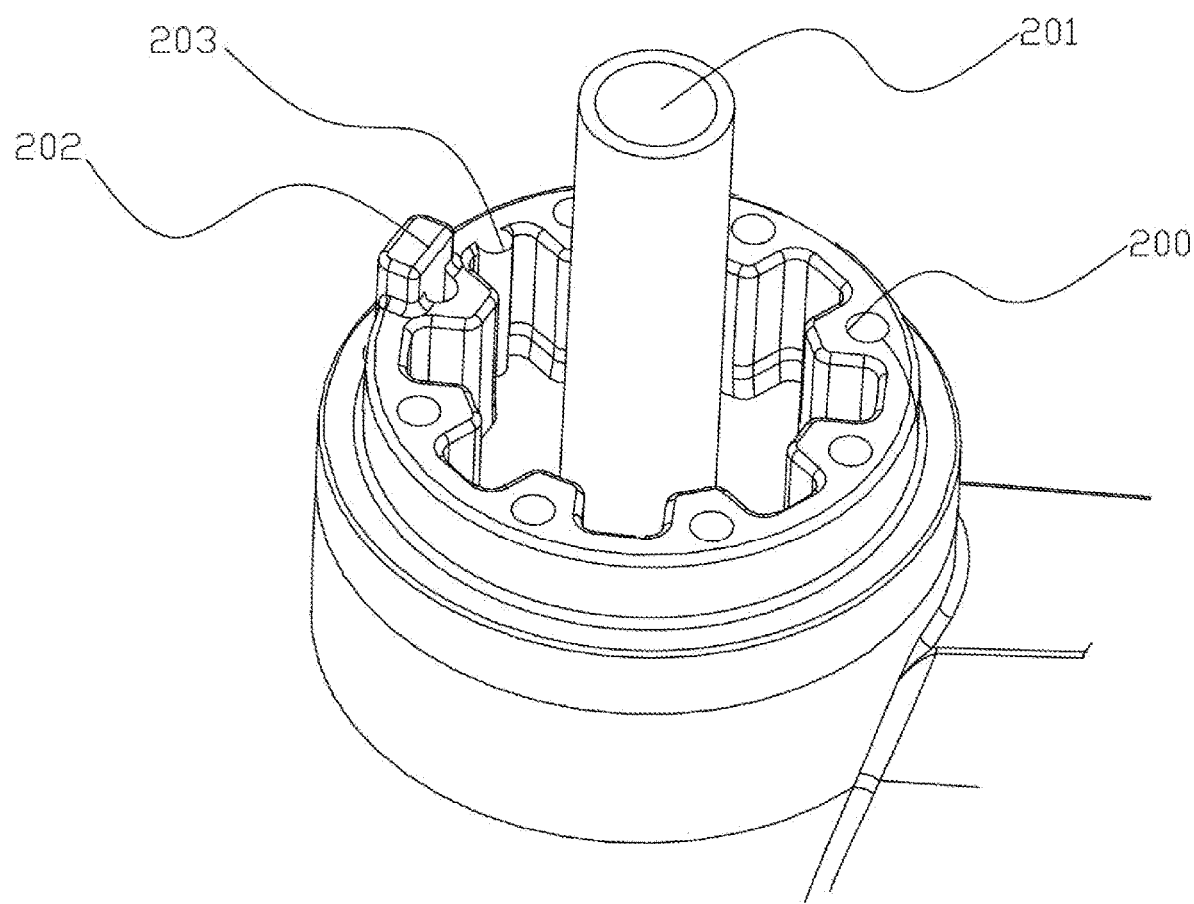
FIG. 5 is a partially enlarged view of a part A in FIG. 4.
Figure 7:
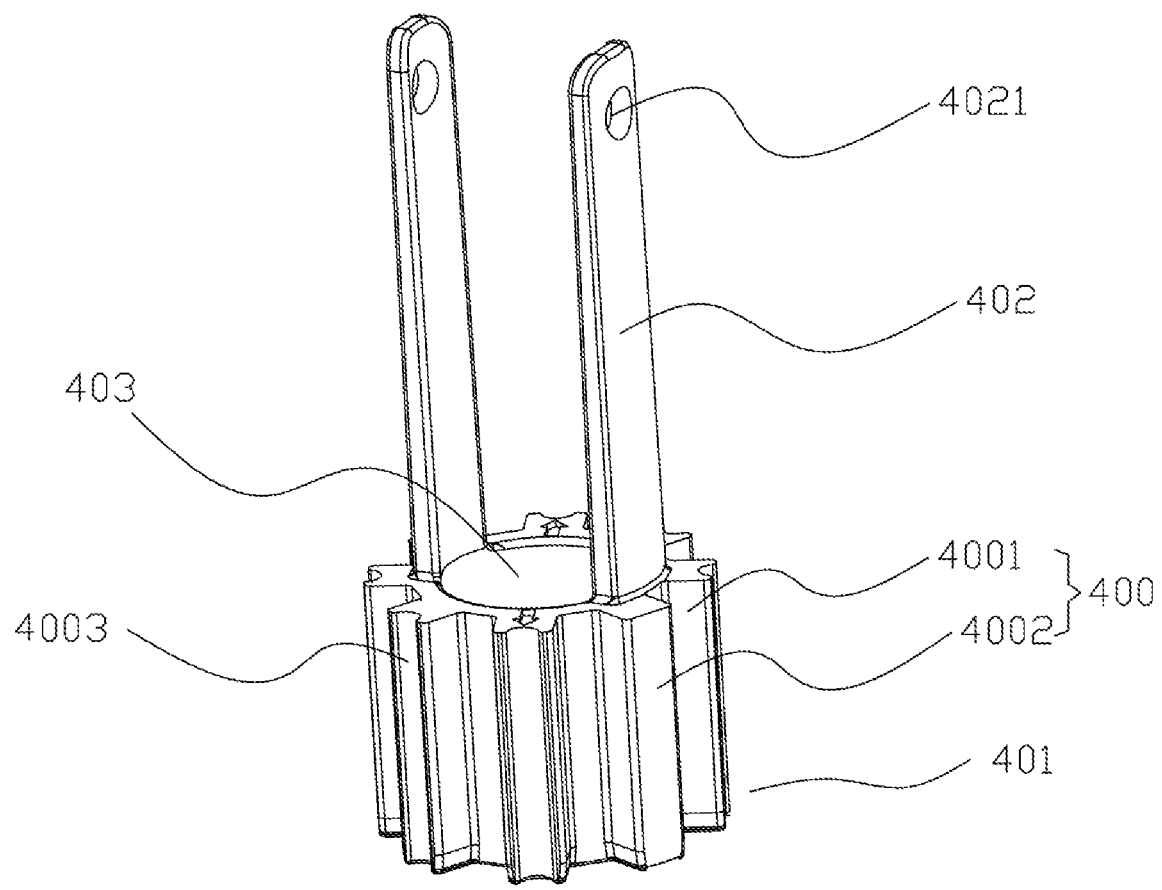
FIG. 7 is a schematic view of a sliding engagement part according to an embodiment of the present disclosure.

Optionally, the connecting rod 50 is a long rod screw, and the fixing head is a screw head. The second center hole 301 is provided with an internal thread, the long rod screw is provided with an external thread, and the external thread of the upper end of the long rod screw and the internal thread in the second center hole 301 are connected and fixed to each other. Additionally, the first center hole 201 and the third center hole 403 are provided with no internal thread, to enable the sliding engagement part 40 to freely rotate about the axis of the connecting rod 50, In the present embodiment, as illustrated in FIG. 7, the sliding engagement part 40 is provided with several first engaging teeth 400, and as illustrated in FIGS. 4 and 5, the fixed member 20 is provided with several third engaging teeth 200. In the present embodiment, the employed operation part is a sliding sleeve 60 that is slidably fitted over an outer wall of the rotating member 30, the sliding sleeve 60 is slidable up and down in a length direction of the rotating member 30, and the sliding sleeve 60 is connected to the sliding engagement part 40 by a link rod 80. Specifically, a wall face of the rotating member 30 defines a slot hole 302, and the sliding engagement part 40 includes a head part 401 and a wing plate 402 provided on the head part 401. Two wing plates 402 are arranged symmetrically, and the two wing plates 402 are each provided with one connection hole 4021. The first engaging teeth 400 are provided on an outer circumferential wall of the head part 401. The rotating member 30 defines two penetrating holes 303 for the wing plates 402, the link rod 80 passes through the slot hole 302 and the connection hole 4021, and two ends of the link rod 80 are separately fixed to the sliding sleeve 60, to accomplish fixing of the sliding sleeve 60 and the sliding engagement part 40. The wing plate 402 is slidably provided in the penetrating hole 303, and thus the penetrating hole 303 can have a guiding effect when the operation part controls the sliding engagement part 40 to move. The link rod 80 is slidable in the length direction of the slot hole 302, the sliding engagement part 40 and the rotating member 30 are fixed together by the link rod 80, to enable the sliding engagement part 40 to move in the axis direction and to prevent relative rotation between the sliding engagement part 40 and the rotating member 30. The sliding sleeve 60 covers the slot hole 302. The sliding sleeve 60 provided on the rotating member 30 can facilitate unlocking and locking operations of the user, and the sliding sleeve 60 also can cover the slot hole 302 to make the device more aesthetic.

The rotating member 30 includes a movable state and a locked state. When in the movable state, the first engaging teeth 400 and the third engaging teeth 200 are separated from each other, and in this case the rotating member 30 can perform rotational motion about the axis of the connecting rod 50, to achieve adjustment for rotation angle and position of the handle body 10 connected thereto. When in the locked state, the first engaging teeth 400 and the third engaging teeth 200 are engaged, and in this case the relative position between the rotating member 30 and the fixed member 20 is fixed, to achieve fixing for rotation angle and position of the handle body 10.

Optionally, when in the movable state, the sliding engagement part 40 can move to a position where the first engaging teeth 400 and the second engaging teeth 300 are separated, and thus motions of the sliding engagement part 40 and the rotating member 30 do not interfere with each other during the rotation of the rotating member 30. In the present embodiment, in order to reduce arrangement space, the first engaging teeth 400 and the second engaging teeth 300 are always kept in an engaged or locked state. Therefore, when in the locked state, the first engaging teeth 400 moves to a position where they engage with the second engaging teeth 300 and the third engaging teeth 200 at the same time to fix the relative position between the rotating member 30 and the fixed member 20; and when in the movable state, just move the sliding engagement part 40 to separate the first engaging teeth 400 and the third engaging teeth 200, and in this case when the rotating member 30 rotates, it will drive the sliding engagement part 40 to rotate about the axis of the connecting rod 50.

Specifically, when angle of the handle body 10 needs to be adjusted, the user pulls the operation part upwards to drive the sliding engagement part 40 to move upwards and away from the fixed member 20 to disengage the first engaging teeth 400 and the third engaging teeth 200. In this case, relative rotation between the rotating member 30 and the fixed member 20 is enabled, and the user can grip the handle body 10 and rotate it to a desired angle. When the position of the handle body 10 needs to be locked, the user pushes the operation part downwards to drive the sliding engagement part 40 to move downwards and slide towards the fixed member 20 to engage the first engaging teeth 400 and the third engaging teeth 200, thereby achieving fixing of the position between the rotating member 30 and the fixed member 20. In this case, the rotating member 30 cannot perform a rotational movement relative to the fixed member 20 to make position of the handle body 10 fixed. The present device achieves unlocking or locking of the rotating member 30 by the operation part driving action of the sliding engagement part 40, and when in the locked state the position of the handle body 10 is fixed and cannot be unlocked by moving the handle body 10. Thus, it is not easy to unlock the handle body 10 inadvertently during use, and the service life of the device can also be extended at the same time. Additionally, the orientation of the handle body 10 can be more stably and accurately adjusted by way of adjusting the rotation angle of the handle body 10 through engagement of engaging teeth.

Preferably, the present embodiment is also provided with an elastic member. The elastic member employs a spring 70. The spring 70 is provided in a chamber of the rotating member 30. The spring 70 has an upper end abutting against the rotating member 30 and a lower end abutting against the sliding engagement part 40. The spring 70 is always in a compressed state to provide a downward action force on the sliding engagement part 40. Thus, it is ensured that in the locked state, the sliding engagement part 40 always keeps the first engaging teeth 400 and third engaging teeth 200 in an engaged state, and the position of the sliding engagement part 40 is not easy to change, ensuring the stability of the locking. When the rotating member 30 is in the movable state and the user pulls the operation part, the sliding engagement part 40 is moved upwards to overcome the elastic force action of the spring 70 and further compress the spring 70, and thus the first engaging teeth 400 and the third engaging teeth 200 are disengaged. In this case, the rotating member 30 can be rotated to adjust the angle of the handle body 10. After completion of the adjustment, the user releases the operation part, and the elastic force action of the spring 70 will push the sliding engagement part 40 downwards to move the sliding engagement part 40 until the first engaging teeth 400 and the third engaging teeth 200 are in the engaged state, thereby achieving the locking.

In the present embodiment, a rotating guide mechanism is also provided. The rotating guide mechanism includes a guiding groove 304 and a guiding protrusion 202. The guiding groove 304 is formed in the rotating member 30, and a corresponding guiding protrusion 202 is provided on the fixed member 20; or, the guiding groove 304 is defined in the fixed member 20, and the corresponding guiding protrusion 202 is provided on the rotating member 30. In the present embodiment, the guiding groove 304 is defined in the rotating member 30, and the guiding protrusion 202 is provided on the fixed member 20.

Specifically, an outer circumference of an end of the rotating member 30 abutting against the fixed member 20 is provided with annular limiting wall 305, the first engaging teeth 400 are provided at an inner side of the limiting wall 305, and an upper end face of the first engaging teeth 400 is lower than an end face of the limiting wall 305. The guiding groove 304 is an arc-shaped groove surrounding the connecting rod 50 at the inner side of the limiting wall 305, and the contour trace of the guiding groove 304 is consistent with the movement trace of the guiding protrusion 202. A bottom face of the guiding groove 304 is lower than the upper end face of the first engaging teeth 400. The guiding groove 304 may be formed as a semi-circular groove, a full circular groove, or a ¼ circular groove, to limit extreme rotation angle of the rotating member 30.

The third engaging teeth 200 are provided on an end of the fixed member 20 abutting against the rotating member 30. An outer wall face of the third engaging teeth 200 is at an inner side of an outer wall face of the fixed member 20, the outer wall face of the fixed member 20 is flush with an outer wall face of the limiting wall 305 on the rotating member 30, and the outer wall face of the third engaging teeth 200 is placed in an inner wall face of the limiting wall 305 and they abut against each other. The guiding protrusion 202 is provided on the upper end face of the third engaging teeth 200, the rotating member 30 and the fixed member 20 abut against each other, and meanwhile the guiding protrusion 202 is snap-fitted into the guiding groove 304. Thus, the connection between the rotating member 30 and the fixed member 20 is neater and more aesthetic.

Particularly, in the present embodiment, the first engaging teeth include a first tooth body 4001 and a second tooth body 4002, and an angle limiting protrusion 203 is also provided. At least one angle limiting protrusion 203 is provided between adjacent third engaging teeth 200.

A wall face of the first tooth body 4001 defines a limiting groove 4003 matching the angle limiting protrusion 203. The second tooth body 4002 is a solid tooth, and when the angle limiting protrusion 203 rotates to correspond to the second tooth body 4002, the first engaging teeth 400 cannot engage with the third engaging teeth 200. When the first engaging teeth 400 engage with the third engaging teeth 200, the angle limiting protrusion 203 is snap-fitted into the limiting groove 4003. The angle limiting protrusion 203 is used to exclude positioning of some special angles, and when at an angle suitable for adjustment, the wall face of a corresponding first tooth body 4001 is provided with the limiting groove 4003 matching the angle limiting protrusion 203. In this case, the first engaging teeth 400 can engage with the third engaging teeth 200 to lock the position of the rotating member 30. When rotated to an excluded angle, the angle limiting protrusion 203 and the second tooth body 4002 are in the same axis direction. In this case, since the second tooth body 4002 is provided with no limiting groove 4003, the angle limiting protrusion 203 will abut against an end face of the second tooth body 4002 and the first engaging teeth 400 cannot engage with the third engaging teeth 200, to achieving exclusion of positioning of special angles.

Optionally, the operation part may also be an operation rod having an end extending out of the handle body 10, the handle body 10 defines a through hole, the operation rod is slidably connected in the through hole, and the end of the operation rod extending out of the handle body 10 facilitates the operation of the user. The operator achieves control of action of the sliding unlocking assembly by pulling the operation rod.

In the solution, when the angle of the handle body 10 does not need to adjust, the elastic force action of the spring 70 fixes the position of the sliding engagement part 40 at a lower end of the cavity in the rotating member 30, and in this case the first engaging teeth 400 and the third engaging teeth 200 are engaged, and the rotating member 30 cannot rotate relative to the fixed member 20, to achieve fixing of the position and angle of the handle body 10; and when the angle of the handle body 10 needs to adjust, the user pull the sliding sleeve 60 upwards, to drive the sliding engagement part 40 to move upwards, in this case the first engaging teeth 400 and the third engaging teeth 200 are separated, the rotating member 30 can rotate relative to the fixed member 20, and in this case the user may release the sliding sleeve 60 after rotating the handle body 10 to a desired angle, the spring 70 will push the sliding engagement part 40 restore under the action of the spring 70 elastic force action to re-engage the first engaging teeth 400 with the third engaging teeth 200, thereby locking the angle and position of the handle body 10.

Embodiment 2

The present embodiment is similar to Embodiment 1. The difference lies in that in the present embodiment, the employed sliding unlocking assembly is an insertion pin. The rotating member 30 defines several first pin holes, the fixed member 20 defines several second pin holes. When the rotating member 30 is in the movable state, the operation part drives the insertion pin to move upwards in the length direction of the connecting rod 50, to separate the insertion pin from the first pin hole and the second pin hole.

When the rotating member 30 is in the locked state, the operation part drives the insertion pin to move downwards in the length direction of the connecting rod 50, to pass the insertion pin through the first pin hole and the second pin hole. When locking the rotating member 30, the insertion pin is inserted into the first pin hole and the second pin hole simultaneously, and thus the rotating member 30 cannot rotate about the connecting rod 50, to achieve the locking.

Embodiment 3

Figure 6:
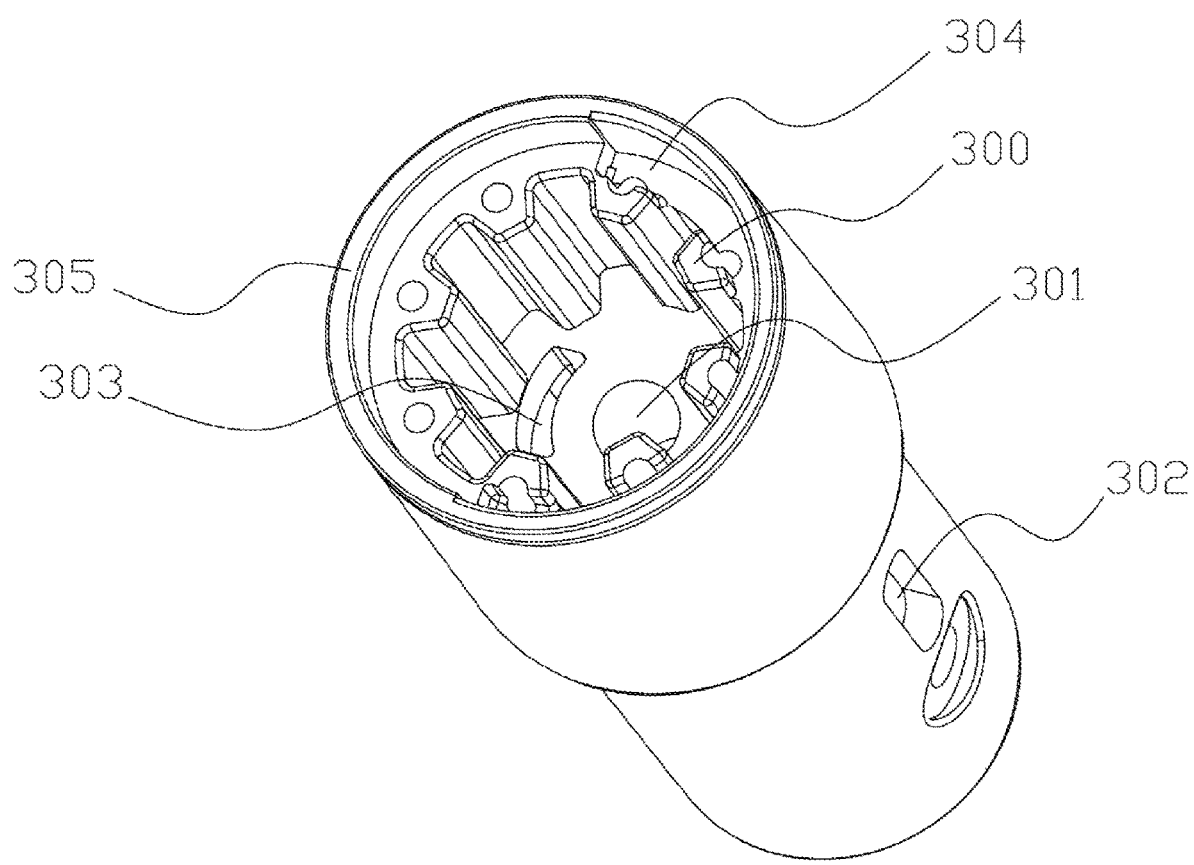
FIG. 6 is a schematic view of a rotating member according to an embodiment of the present disclosure.

The present embodiment is similar to Embodiment 1, but the difference lies in that in the present embodiment, as illustrated in FIG. 6, an inner wall face of the rotating member 30 is provided with several second engaging teeth 300. The second engaging teeth 300 and the third engaging teeth 200 have the same size, the second engaging teeth 300 and the third engaging teeth 200 are provided on different plane directions, the second engaging teeth 300 also have a guiding effect, and when the first engaging teeth 400 and the second engaging teeth 300 are engaged, the sliding engagement part 40 is slidable in the axial direction. When it is required to change from the movable state to the locked state, the rotating member 30 is rotated to align the second engaging teeth 300 and the third engaging teeth 200 in the axis direction, and in this case, the sliding engagement member 40 can slide towards the fixed member 20 in the axis direction to enable the first engaging teeth 400 to engage with the third engaging teeth 200. Additionally, the first engaging teeth 400 can engage with the second engaging teeth 300 and the third engaging teeth 200 at the same time, and the relative non-rotating between the sliding engagement part 40 and the rotating member 30 can be achieved.

Embodiment 4

Figure 8:
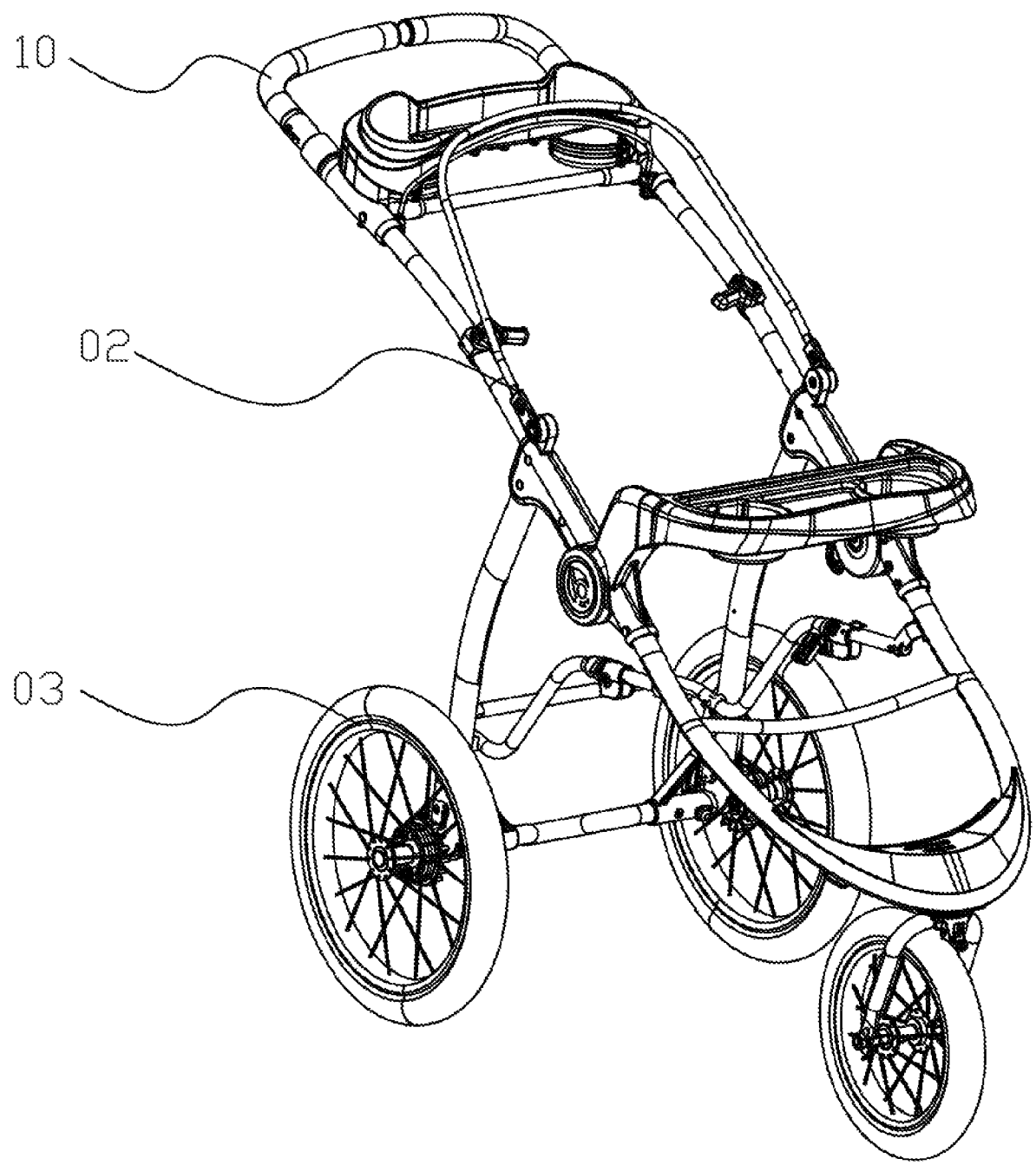
FIG. 8 is a schematic view of a baby cart according to an embodiment of the present disclosure.

The present embodiment is a baby cart which includes a cart handle of Embodiments 1 to 3. as illustrated in FIG. 8, the cart includes a cart wheel 03, a cart frame 02 and a cart handle. The cart frame is used to carry a baby, the cart wheel 03 is mounted to a bottom of the cart frame 02 to move the cart frame 02, and the cart handle is mounted to an upper portion of the cart frame 02 for grip of the user and controlling movement of the cart.

The above description is only the principles and preferred embodiments of the present application. It should be pointed out that for those of ordinary skill in the art, several other modifications can be made based on the principles of this application, which should also be deemed as the scope of the present application.

What is claimed is:

1. A cart handle, comprising:
a handle body;
a fixed member;
a rotating member, the fixed member and the rotating member lying along a common axis, wherein the rotating member is rotatable about the axis relative to the fixed member and is positionable at a plurality of different rotation angles about the axis, the rotating member and the fixed member being non-displaced or kept unseparated along the axis, wherein the handle body is fixedly connected to, integrally formed with or detachably and fixedly connected to the rotating member;
a sliding unlocking assembly slidable along the axis relative to the rotating member, the sliding unlocking assembly including a sliding engagement part;
wherein the rotating member and the sliding engagement part are relatively non-rotating and the rotating member comprises a movable state and a locked state;
such that when the rotating member is in the locked state, the sliding unlocking assembly slides towards the fixed member and is locked with the fixed member to make the fixed member and the rotating member relatively non-rotating,
when the rotating member is in the movable state, the sliding unlocking assembly slides away from the fixed member and unlocks the rotating member to make the rotating member rotatable relative to the fixed member; and
a rotating guide mechanism comprising a guiding groove and a guiding protrusion, wherein the guiding protrusion is slidably provided in the guiding groove; wherein the guiding groove is formed in the rotating member, and the guiding protrusion is provided on the fixed member, or the guiding groove is formed in the fixed member, and the guiding protrusion is provided on the rotating member; such that when the rotating member and the fixed member rotate relatively, the guiding protrusion slides along and in the guiding groove.

2. The cart handle according to claim 1, wherein the sliding engagement part is provided with first engaging teeth, the fixed member is provided with third engaging teeth, and the first engaging teeth and the third engaging teeth are positionable at a plurality of different rotation angles;
such that when the rotating member is in the movable state, the sliding engagement part moves upwards along the axis to separate the first engaging teeth and the third engaging teeth, and the rotating member and the handle body are rotatable about the axis; and
when the rotating member is in the locked state, the sliding engagement part moves downwards along the axis to engage the first engaging teeth and the third engaging teeth, and positions of the rotating member and the handle body are relatively fixed;
wherein the rotating member is provided with second engaging teeth, the first engaging teeth engage with the second engaging teeth to make the sliding engagement part and the rotating member relatively non-rotating.

3. The cart handle according to claim 2, wherein the sliding unlocking assembly further comprises an elastic member that pushes the sliding engagement part along the axis to keep the locked state with the fixed member, and the elastic member is provided between the sliding engagement part and the rotating member.

4. The cart handle according to claim 2, wherein the first engaging teeth include a first tooth body and a second tooth body;
the fixed member includes an angle limiting protrusion between adjacent ones of the third engaging teeth, a wall face of the first tooth body defines a limiting groove matching the angle limiting protrusion, and when the first engaging teeth engage with the third engaging teeth, the angle limiting protrusion is snap-fitted into the limiting groove; and
wherein the second tooth body is a solid tooth, such that when the angle limiting protrusion rotates to a corresponding second tooth body, the first engaging teeth cannot engage with the third engaging teeth.

5. The cart handle according to claim 2, wherein the fixed member and the rotating member are connected through a connecting rod, the fixed member includes a first center hole, the rotating member includes a second center hole, the sliding engagement part defines a third center hole, the connecting rod passes through the first center hole, the second center hole and the third center hole, the connecting rod is fixedly connected to the second center hole, an end of the connecting rod is provided with a fixing head, the fixed member defines a fixing chamber in communication with the first center hole, the fixing head is snap-fitted into the fixing chamber, an end face of the fixing head abuts against an end face of the fixing chamber to make positions of the rotating member and the fixed member relatively fixed along an axis of the connecting rod.

6. The cart handle according to claim 5, wherein the sliding engagement part comprises a head part and a wing plate provided on the head part, the first engaging teeth are provided on an outer circumferential wall of the head part, and the rotating member defines a penetrating hole for passage of the wing plate.

7. The cart handle according to claim 1, further comprising an operation part, wherein the operation part is a sliding sleeve slidably fitted over an outer circumference of the rotating member, the sliding sleeve is connected to the sliding unlocking assembly through a link rod, the rotating member defines a slot hole, the link rod passes through the slot hole and is connected to the sliding unlocking assembly to enable the sliding unlocking assembly to slide along the axis relative to the rotating member and make the sliding engagement part and the rotating member relatively non-rotating; the sliding sleeve covers the slot hole, and when the sliding sleeve slides along the axis away from the fixed member, the sliding engagement part is driven to unlock the rotating member.

8. The cart handle according to claim 7, wherein the operation part is an operation rod having an end extending out of the handle body, the operation rod is connected to the sliding unlocking assembly, and the operation rod is slidably connected to the handle body.

9. A baby cart, comprising: the cart handle of claim 1, a cart frame on which the cart handle is located, and cart wheels connected to the cart frame.

10. A cart handle, comprising:
a handle body;
a fixed member;
a rotating member, the fixed member and the rotating member lying along a common axis, wherein the rotating member is rotatable about the axis relative to the fixed member and is positionable at a plurality of different rotation angles about the axis, the rotating member and the fixed member being non-displaced or kept unseparated along the axis, wherein the handle body is fixedly connected to, integrally formed with or detachably and fixedly connected to the rotating member;
a sliding unlocking assembly slidable along the axis relative to the rotating member, the sliding unlocking assembly including a sliding engagement part;
wherein the rotating member and the sliding engagement part are relatively non-rotating and the rotating member comprises a movable state and a locked state;
such that when the rotating member is in the locked state, the sliding unlocking assembly slides towards the fixed member and is locked with the fixed member to make the fixed member and the rotating member relatively non-rotating,
when the rotating member is in the movable state, the sliding unlocking assembly slides away from the fixed member and unlocks the rotating member to make the rotating member rotatable relative to the fixed member;
wherein the sliding engagement part is provided with first engaging teeth, the fixed member is provided with third engaging teeth, and the first engaging teeth and the third engaging teeth are positionable at a plurality of different rotation angles;
such that when the rotating member is in the movable state, the sliding engagement part moves upwards along the axis to separate the first engaging teeth and the third engaging teeth, and the rotating member and the handle body are rotatable about the axis;
when the rotating member is in the locked state, the sliding engagement part moves downwards along the axis to engage the first engaging teeth and the third engaging teeth, and positions of the rotating member and the handle body are relatively fixed;
wherein the rotating member is provided with second engaging teeth, the first engaging teeth engage with the second engaging teeth to make the sliding engagement part and the rotating member relatively non-rotating;
wherein the first engaging teeth include a first tooth body and a second tooth body;

the fixed member includes an angle limiting protrusion between adjacent ones of the third engaging teeth, a wall face of the first tooth body defines a limiting groove matching the angle limiting protrusion, and when the first engaging teeth engage with the third engaging teeth, the angle limiting protrusion is snap-fitted into the limiting groove; and
wherein the second tooth body is a solid tooth, such that when the angle limiting protrusion rotates to a corresponding second tooth body, the first engaging teeth cannot engage with the third engaging teeth.

11. A baby cart, comprising: the cart handle of claim 10, a cart frame on which the cart handle is located, and cart wheels connected to the cart frame.

12. A cart handle, comprising:
a handle body;
a fixed member;
a rotating member, the fixed member and the rotating member lying along a common axis, wherein the rotating member is rotatable about the axis relative to the fixed member and is positionable at a plurality of different rotation angles about the axis, the rotating member and the fixed member being non-displaced or kept unseparated along the axis, wherein the handle body is fixedly connected to, integrally formed with or detachably and fixedly connected to the rotating member;
a sliding unlocking assembly slidable along the axis relative to the rotating member, the sliding unlocking assembly including a sliding engagement part;
wherein the rotating member and the sliding engagement part are relatively non-rotating and the rotating member comprises a movable state and a locked state;
such that when the rotating member is in the locked state, the sliding unlocking assembly slides towards the fixed member and is locked with the fixed member to make the fixed member and the rotating member relatively non-rotating,
when the rotating member is in the movable state, the sliding unlocking assembly slides away from the fixed member and unlocks the rotating member to make the rotating member rotatable relative to the fixed member;
wherein the sliding engagement part is provided with first engaging teeth, the fixed member is provided with third engaging teeth, and the first engaging teeth and the third engaging teeth are positionable at a plurality of different rotation angles;
such that when the rotating member is in the movable state, the sliding engagement part moves upwards along the axis to separate the first engaging teeth and the third engaging teeth, and the rotating member and the handle body are rotatable about the axis;
when the rotating member is in the locked state, the sliding engagement part moves downwards along the axis to engage the first engaging teeth and the third engaging teeth, and positions of the rotating member and the handle body are relatively fixed;
wherein the rotating member is provided with second engaging teeth, the first engaging teeth engage with the second engaging teeth to make the sliding engagement part and the rotating member relatively non-rotating;
wherein the fixed member and the rotating member are connected through a connecting rod, the fixed member includes a first center hole, the rotating member includes a second center hole, the sliding engagement part defines a third center hole, the connecting rod passes through the first center hole, the second center hole and the third center hole, the connecting rod is fixedly connected to the second center hole, an end of the connecting rod is provided with a fixing head, the fixed member defines a fixing chamber in communication with the first center hole, the fixing head is snap-fitted into the fixing chamber, an end face of the fixing head abuts against an end face of the fixing chamber to make positions of the rotating member and the fixed member relatively fixed along an axis of the connecting rod.

13. A baby cart, comprising: the cart handle of claim 12, a cart frame on which the cart handle is located, and cart wheels connected to the cart frame.

14. A cart handle, comprising:
   a handle body;
   a fixed member;
   a rotating member, the fixed member and the rotating member lying along a common axis, wherein the rotating member is rotatable about the axis relative to the fixed member and is positionable at a plurality of different rotation angles about the axis, the rotating member and the fixed member being non-displaced or kept unseparated along the axis, wherein the handle body is fixedly connected to, integrally formed with or detachably and fixedly connected to the rotating member;
   a sliding unlocking assembly slidable along the axis relative to the rotating member, the sliding unlocking assembly including a sliding engagement part;
   wherein the rotating member and the sliding engagement part are relatively non-rotating and the rotating member comprises a movable state and a locked state;
   such that when the rotating member is in the locked state, the sliding unlocking assembly slides towards the fixed member and is locked with the fixed member to make the fixed member and the rotating member relatively non-rotating,
   when the rotating member is in the movable state, the sliding unlocking assembly slides away from the fixed member and unlocks the rotating member to make the rotating member rotatable relative to the fixed member;
   an operation part, wherein the operation part is a sliding sleeve slidably fitted over an outer circumference of the rotating member, the sliding sleeve is connected to the sliding unlocking assembly through a link rod, the rotating member defines a slot hole, the link rod passes through the slot hole and is connected to the sliding unlocking assembly to enable the sliding unlocking assembly to slide along the axis relative to the rotating member and make the sliding engagement part and the rotating member relatively non-rotating; the sliding sleeve covers the slot hole, and when the sliding sleeve slides along the axis away from the fixed member, the sliding engagement part is driven to unlock the rotating member.

15. A baby cart, comprising: the cart handle of claim 14, a cart frame on which the cart handle is located, and cart wheels connected to the cart frame.

* * * * *